(12) United States Patent
Jang et al.

(10) Patent No.: US 7,760,303 B2
(45) Date of Patent: Jul. 20, 2010

(54) LIQUID CRYSTAL DISPLAY DEVICE

(75) Inventors: Hyung-Seok Jang, Gyeonggi-do (KR);
In-Jae Chung, Gyeonggi-do (KR);
Joon-Kyu Park, Gyeonggi-do (KR);
Hyun-Suk Jin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 711 days.

(21) Appl. No.: 11/639,136

(22) Filed: Dec. 15, 2006

(65) Prior Publication Data
US 2007/0153188 A1 Jul. 5, 2007

(30) Foreign Application Priority Data
Dec. 29, 2005 (KR) .................. 10-2005-0133551

(51) Int. Cl.
*G02F 1/1337* (2006.01)
*G02F 1/1343* (2006.01)

(52) U.S. Cl. .................... 349/129; 349/139

(58) Field of Classification Search ............ 349/129, 349/139, 141
See application file for complete search history.

(56) References Cited

U.S. PATENT DOCUMENTS

| | | | |
|---|---|---|---|
| 2001/0050746 A1 | 12/2001 | Song | |
| 2002/0001058 A1 | 1/2002 | Wang | |
| 2003/0146893 A1 | 8/2003 | Sawabe | |
| 2003/0197819 A1 | 10/2003 | Sunohara et al. | |
| 2005/0112342 A1 | 5/2005 | MacMaster | 428/212 |
| 2005/0237447 A1 | 10/2005 | Ono | |
| 2007/0121047 A1* | 5/2007 | Chung et al. | 349/141 |
| 2007/0153196 A1* | 7/2007 | Jang et al. | 349/143 |
| 2007/0200989 A1* | 8/2007 | Shinichi et al. | 349/129 |

FOREIGN PATENT DOCUMENTS

| | | |
|---|---|---|
| DE | 10 2006 029 909 A1 | 6/2007 |
| JP | 2007-156403 | 6/2007 |
| WO | WO 01/25842 A1 | 4/2001 |

\* cited by examiner

*Primary Examiner*—Dung T. Nguyen
(74) *Attorney, Agent, or Firm*—Morgan Lewis & Bockius LLP

(57) ABSTRACT

A liquid crystal display device includes a first substrate; a second substrate facing the first substrate; a liquid crystal layer interposed between the first and second substrates; first, second, third, and fourth sub-pixels defined on the first and second substrates; a first electric field distorting pattern on the first, second and third sub-pixels on the first substrate; a second electric field distorting pattern on the first, second and third sub-pixels on the second substrate; a third electric field distorting pattern on the fourth sub-pixel on the first substrate; and a fourth electric field distorting pattern on the fourth sub-pixel on the second substrate, wherein the first and second electric field distorting patterns are parallel to each other, and wherein the third and fourth electric field distorting patterns are parallel to each other at an angle that is different than that of the first and second distorting patterns.

18 Claims, 11 Drawing Sheets

| SP1 | SP2 | SP1 | SP2 | SP1 | SP2 |
|---|---|---|---|---|---|
| VSP1 | SP3 | VSP2 | SP3 | VSP1 | SP3 |
| SP1 | SP2 | SP1 | SP2 | SP1 | SP2 |
| VSP1 | SP3 | VSP2 | SP3 | VSP1 | SP3 |
| SP1 | SP2 | SP1 | SP2 | SP1 | SP2 |
| VSP1 | SP3 | VSP2 | SP3 | VSP2 | SP3 |

FIG. 6B

| SP1 | SP2 | SP3 | VSP1 | SP1 | SP2 | SP3 | VSP2 | SP1 | SP2 | SP3 | VSP1 |
|---|---|---|---|---|---|---|---|---|---|---|---|
| SP1 | SP2 | SP3 | VSP1 | SP1 | SP2 | SP3 | VSP2 | SP1 | SP2 | SP3 | VSP1 |
| SP1 | SP2 | SP3 | VSP1 | SP1 | SP2 | SP3 | VSP2 | SP1 | SP2 | SP3 | VSP1 |
| SP1 | SP2 | SP3 | VSP1 | SP1 | SP2 | SP3 | VSP2 | SP1 | SP2 | SP3 | VSP1 |

FIG. 6C

| SP1 | SP2 | SP1 | SP2 | SP1 | SP2 |
|-----|-----|-----|-----|-----|-----|
| VSP1 | SP3 | VSP1 | SP3 | VSP1 | SP3 |
| SP1 | SP2 | SP1 | SP2 | SP1 | SP2 |
| VSP2 | SP3 | VSP2 | SP3 | VSP2 | SP3 |
| SP1 | SP2 | SP1 | SP2 | SP1 | SP2 |
| VSP1 | SP3 | VSP1 | SP3 | VSP1 | SP3 |

FIG. 6D

| SP1 | SP2 | SP3 | VSP1 | SP1 | SP2 | SP3 | VSP2 | SP1 | SP2 | SP3 | VSP1 |
|-----|-----|-----|------|-----|-----|-----|------|-----|-----|-----|------|
| SP1 | SP2 | SP3 | VSP2 | SP1 | SP2 | SP3 | VSP1 | SP1 | SP2 | SP3 | VSP2 |
| SP1 | SP2 | SP3 | VSP1 | SP1 | SP2 | SP3 | VSP2 | SP1 | SP2 | SP3 | VSP1 |
| SP1 | SP2 | SP3 | VSP2 | SP1 | SP2 | SP3 | VSP1 | SP1 | SP2 | SP3 | VSP2 |

FIG. 6E

| SP1 | SP2 | SP1 | SP2 | SP1 | SP2 |
|---|---|---|---|---|---|
| VSP1 | SP3 | VSP2 | SP3 | VSP1 | SP3 |
| SP1 | SP2 | SP1 | SP2 | SP1 | SP2 |
| VSP2 | SP3 | VSP1 | SP3 | VSP2 | SP3 |
| SP1 | SP2 | SP1 | SP2 | SP1 | SP2 |
| VSP1 | SP3 | VSP2 | SP3 | VSP1 | SP3 |

FIG. 6F

| SP1 | SP2 | SP3 | VSP2 | SP1 | SP2 | SP3 | VSP2 | SP1 | SP2 | SP3 | VSP2 |
|---|---|---|---|---|---|---|---|---|---|---|---|
| SP1 | SP2 | SP3 | VSP1 | SP1 | SP2 | SP3 | VSP1 | SP1 | SP2 | SP3 | VSP1 |
| SP1 | SP2 | SP3 | VSP2 | SP1 | SP2 | SP3 | VSP2 | SP1 | SP2 | SP3 | VSP2 |
| SP1 | SP2 | SP3 | VSP1 | SP1 | SP2 | SP3 | VSP1 | SP1 | SP2 | SP3 | VSP1 |

LIQUID CRYSTAL DISPLAY DEVICE

The present application claims the benefit of Korean Patent Application No. P2005-0133551 filed in Korea on Dec. 29, 2005, which is hereby incorporated by reference.

BACKGROUND OF THE INVENTION

1. Field of the Invention

The present invention relates to a liquid crystal display device and more particularly to a liquid crystal display device with a restricted viewing angle.

2. Discussion of the Related Art

A liquid crystal display (LCD) includes a first substrate, a second substrate, and a liquid crystal layer. The first and second substrates are facing each other and spaced apart from each other with the liquid crystal layer interposed between the first and second substrates. The LCD device uses optical anisotropy and polarization properties of the liquid crystal molecules to display images.

The liquid crystal molecules have a thin and long orientation. Moreover, a direction of the liquid crystal molecule arrangement may be controlled by applying an electrical field to the liquid crystal molecules. Herein, the LCD device may include a thin film transistor (TFT) as a switching element. This device is referred to as an active matrix LCD (AM-LCD) device which has excellent resolution and superior moving image display characteristics.

Figure 1:
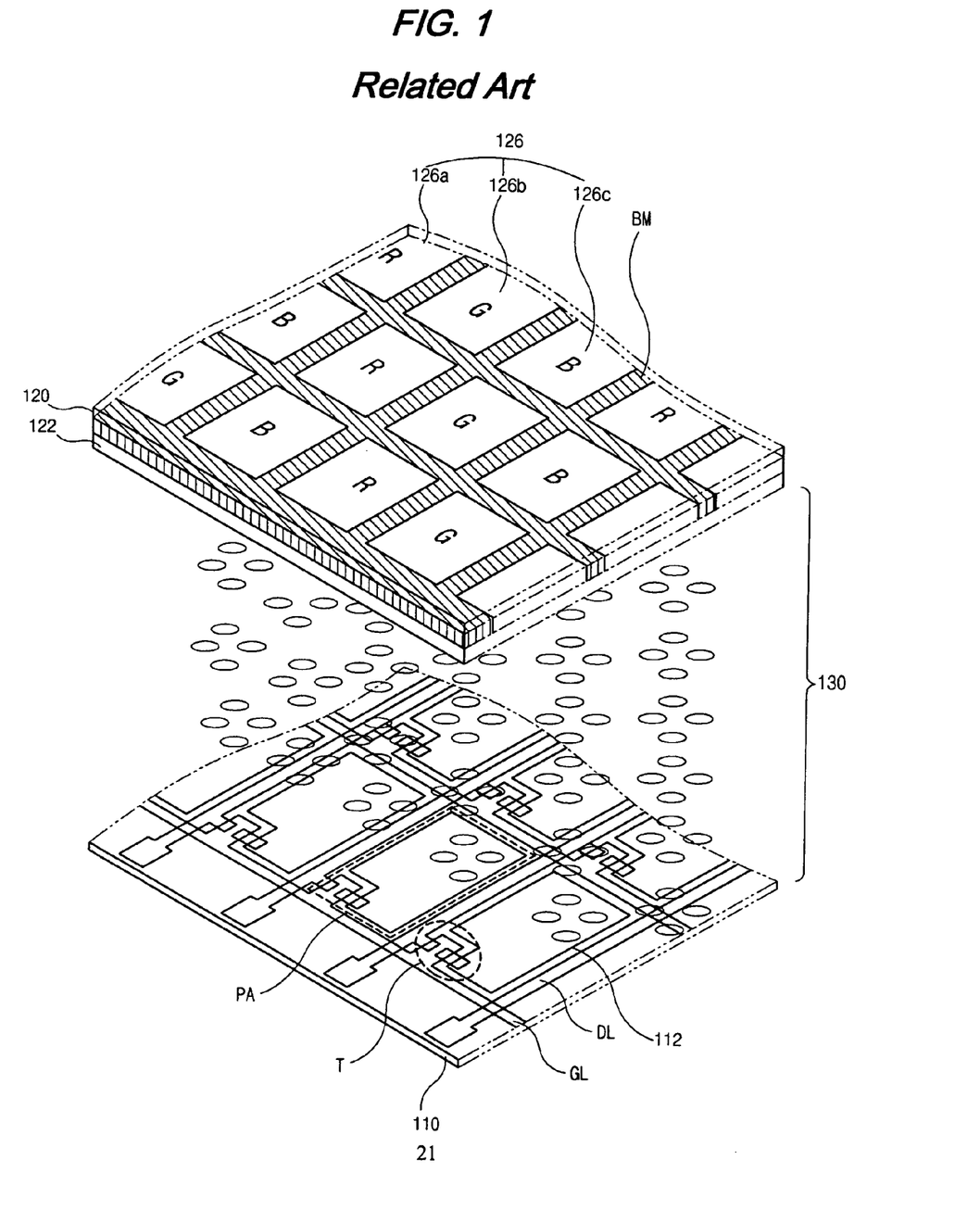
FIG. 1 is an exploded perspective viewing of an LCD device according to the related art.

FIG. 1 is an exploded perspective viewing of an LCD device according to the related art.

As shown in FIG. 1, the first and second substrates 110 and 120 face each other, and the liquid crystal layer 130 is interposed between the first and second substrates 110 and 120. The first substrate 110 includes gate lines GL, data lines DL, thin film transistors (TFT) a "T", and pixel electrodes 112. The gate lines GL and the data lines DL cross each other such that sub-pixel regions PA are defined by the gate and data lines GL and DL. The TFTs "T" are formed at respective crossing portions of the gate and data lines GL and DL, and the pixel electrodes 112 are formed in the respective sub-pixel regions PA and connected to the corresponding TFTs "T".

The second substrate 120 includes a black matrix BM, color filter layers 126, and a common electrode 122. The black matrix BM has a lattice shape to cover a non-display region of the first substrate 110 that includes the gate line GL, data lines DL, and the TFTs "T". The color filter layers 126 includes first, second, and third sub-color filters 126a, 126b, and 126c, respectively. Each of the sub-color filters 126a, 126b, and 126c has one of red, green, and blue colors "R", "G", and "B", and each corresponds to a respective sub-pixel region PA. The common electrode 122 is formed on the black matrix BM and the color filter layers 126 as well as being formed over an entire surface of the second substrate 120. The arrangement of the liquid crystal molecules is controlled by a vertical electric field between the pixel electrode 112 and the common electrode 122, thereby resulting in a change of the amount of transmitted light. Thus, the LCD device displays images. Accordingly, the LCD device using the vertical electric field has a high transmittance and a high aperture ratio. However, the LCD device may include problems such as narrow viewing angle and low contrast ratio.

To resolve the above-mentioned problems, new display devices may include an in-plane switching (IPS) mode LCD device using a horizontal electric field or a vertical alignment (VA) mode LCD device vertically aligning the liquid crystal molecules to the substrate.

Figure 2A:
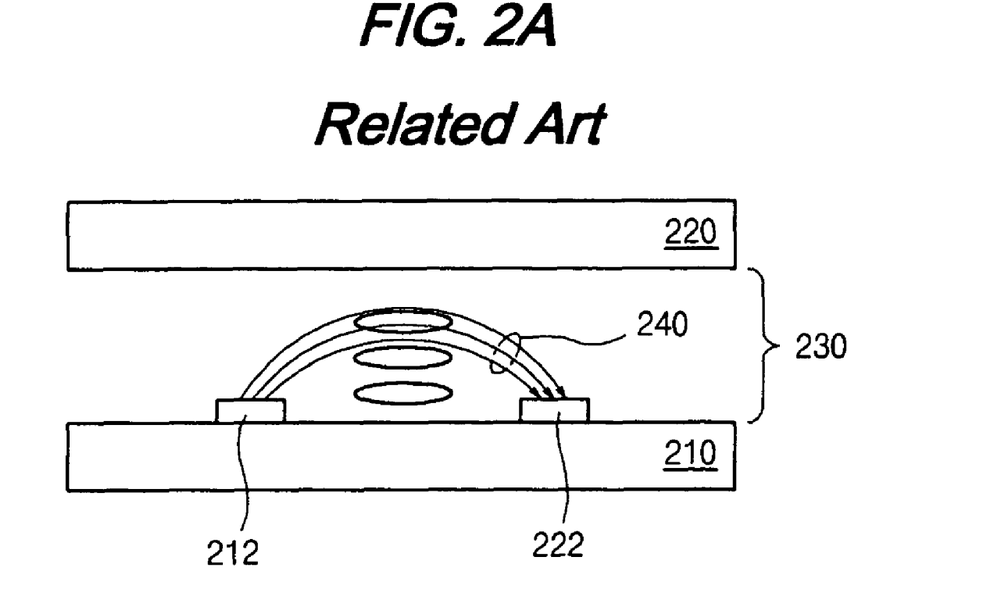
FIGS. 2A and 2B are cross-sectional views of an IPS mode LCD device and a VA mode LCD device, respectively, according to the related art.
Figure 2B:
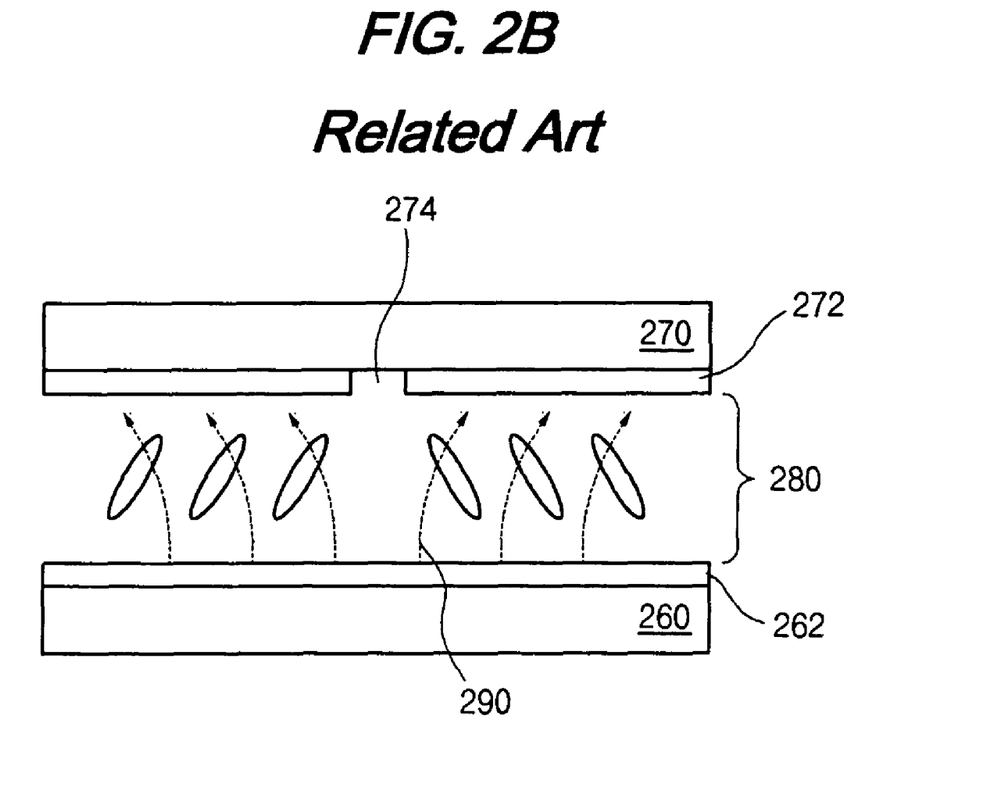

FIGS. 2A and 2B show the IPS mode LCD device and the VA mode LCD device, respectively, according to the related art.

In FIG. 2A, the IPS mode LCD device may include first and second substrates 210 and 220 facing each other, and the liquid crystal layer 230 interposed between the substrates. Both the pixel electrode 212 and the common electrode 222 are formed on the first substrate 210 such that the electric field is horizontally formed between the pixel electrode 212 and common electrode 222. The liquid crystal molecules are controlled by the horizontal electric field between the pixel electrode 212 and common electrode 222. Because a reflective index is relatively uniform at any viewing point, the viewing angle improves.

In FIG. 2B, the VA mode LCD device may include first and second substrates 260 and 270 facing each other with the liquid crystal layer 280 interposed between the first and second substrates 260 and 270. The pixel electrode 262 is formed on the first substrate 260, and the common electrode 272 is formed on the second substrate 270. In an initial state, the liquid crystal molecules in the liquid crystal layer 280 are vertically arranged with respect to the first and second substrates 260 and 270. In addition, a slit 274 is formed in the common electrode 272. An electric field 290 is symmetrically formed between the pixel electrode 262 and common electrode 272 wherein multi-domains are formed. Accordingly, the viewing angle is increased. Because the IPS mode and VA mode provide an improved viewing angle, viewers may see a similar image at a variety of viewing angles.

However, for an automatic teller machine, the LCD display of the automatic teller machine should not be viewable by a person other than the teller machine user. Accordingly, the viewing angle should be restricted so that only the automatic teller machine user can see the image displayed. One method of restricting the viewing angle uses a filter. Unfortunately, this method increases power consumption, production time, and production costs of the LCD device.

SUMMARY OF THE INVENTION

Accordingly, the present invention is directed to a liquid crystal display device that substantially obviates one or more of the problems due to limitations and disadvantages of the related art.

An object of the present invention is to provide a liquid crystal display device having a selectively restrictive viewing angle.

Additional features and advantages of the invention will be set forth in the description which follows, and in part will be apparent from the description, or will be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the liquid crystal display device includes a first substrate; a second substrates facing the first substrate; a liquid crystal layer interposed between the first and second substrates; first, second, third, and fourth sub-pixels defined on each of the first and second substrates; a first electric field distorting pattern on the first, second, and third sub-pixels on the first substrate; a second electric field distorting pattern on the first, second, and third sub-pixels on the second substrate; a third electric field distorting pattern on the fourth sub-pixel on the first substrate; and a fourth electric field distorting pattern on the fourth sub-pixel on the second substrate, wherein the first and second electric field distorting patterns are parallel to each other and have a first angle with respect to a first direction, wherein the third and fourth electric field distorting patterns are parallel to each other and have a second angle, which is different from the first angle, with respect to the first direction.

In another aspect of the present invention, a liquid crystal display device comprises a first substrate; a second substrate facing the first substrate; a liquid crystal layer interposed between the first and second substrates; and first, second, third, and fourth sub-pixels defined on the first and second substrates, the first, second, and third sub-pixels having electric field distorting patterns to increase viewing angle, and the fourth sub-pixel having electric field distorting patterns to restrict viewing angle.

In another aspect of the present invention, a liquid crystal display device comprises a first substrate; a second substrate facing the first substrate; a liquid crystal layer interposed between the first and second substrates; and a pixel array defined on the first and second substrates, each pixel of the pixel array including at least first, second, third and fourth sub-pixels such that the fourth sub-pixel has a restricted viewing angle as compared to the first, second, and third sub-pixels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred exemplary embodiments of the present invention, examples of which are shown in the accompanying drawings.

Figure 3A:
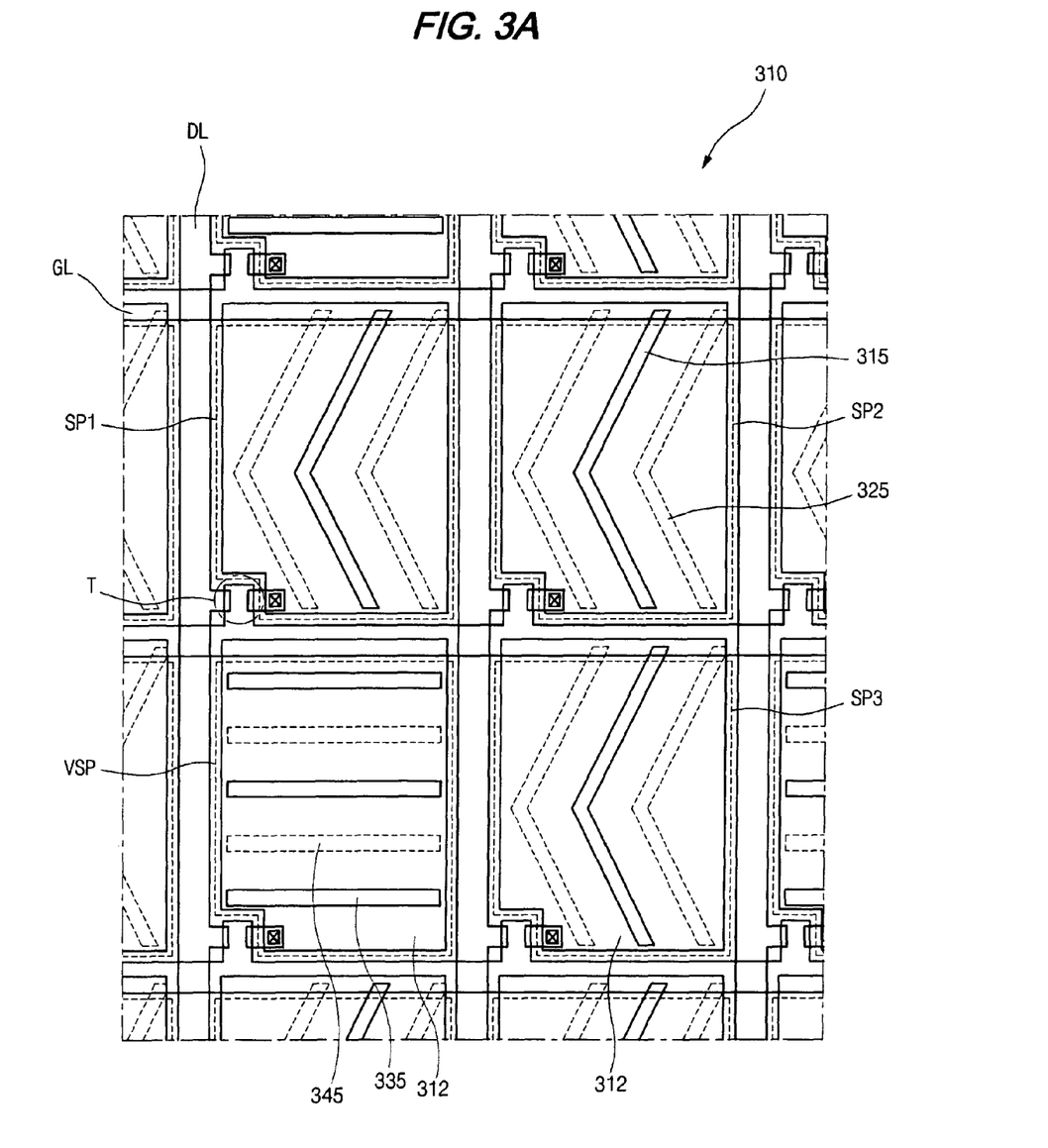
FIGS. 3A and 3B are plane views of an array substrate and a color filter substrate for an exemplary viewing angle restricting LCD device according to the present invention.
Figure 3B:
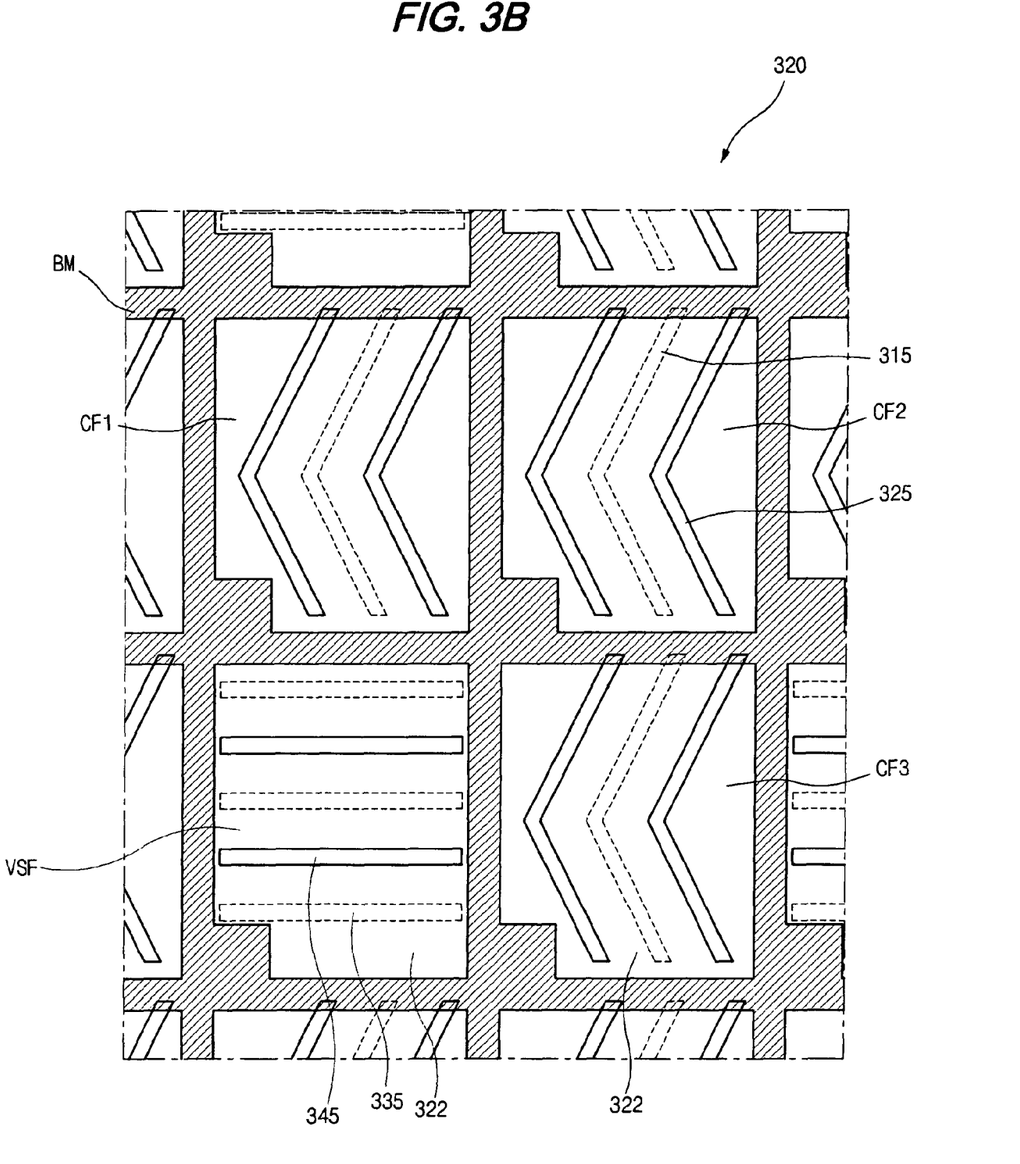

FIGS. 3A and 3B are plane views of an array substrate and a color filter substrate for an exemplary viewing angle restricting LCD device according to the present invention. FIGS. 3A and 3B, the exemplary viewing angle restricting LCD device according to the present invention, includes first and second substrates 310 and 320 facing each other with a liquid crystal layer (not shown) interposed between the first and second substrates 310 and 320. Liquid crystal molecules in the liquid crystal layer may have a vertical orientation with respect to the first and second substrates 310 and 320 in an initial state.

In FIG. 3A, a plurality of unit pixels are defined on the first substrate 310. First, second, and third sub-pixels SP1, SP2, and SP3, and a viewing angle restricting sub-pixel VSP are formed in each unit pixel of the first substrate 310. The four sub-pixels SP1, SP2, SP3, and VSP may be arranged in a matrix shape of two by two or in a row. In FIG. 3B, a plurality of unit pixels are defined on the second substrate 320. First, second, third sub-color filters CF1, CF2, and CF3, and a viewing angle restricting sub-filter VSF are formed in each unit pixel of the second substrate 320. The first sub-color filter CF1 corresponds to the first sub-pixel SP1, and the second sub-color filter CF2 corresponds to the second sub-pixel SP2. The third sub-color filter CF3 corresponds to the third sub-pixel SP3, and the viewing angle restricting sub-pixel VSP corresponds to the viewing angle restricting sub-filter VSF. The first to third sub-color filters CF1, CF2, and CF3, may include one of a red, green, and blue color.

In FIG. 3A, a plurality of gate lines GL and a plurality of data lines DL are formed on the first substrate 310. The plurality of gate lines GL and the plurality of data lines DL cross each other to define the four sub-pixels SP1, SP2, SP3, and VSP. A thin film transistor (TFT) T is formed in each of the four sub-pixels SP1, SP2, SP3, and VSP. The TFT T is formed at a crossing portion of the gate line GL and data line DL. Furthermore, the TFT T is connected to the gate line GL and data line DL. A pixel electrode 312 is formed in the each of the four sub-pixels SP1, SP2, SP3, and VSP, and is connected to the TFT T.

In FIG. 3B, a black matrix BM is formed on the second substrate 320. The black matrix BM corresponds to a non-display region of the first substrate 310 to block light transmitted into the non-display region. The non-display region may include portions of the gate line GL, the data line DL, the TFT T, etc. The black matrix BM includes a plurality of openings corresponding to the sub-pixels SP1, SP2, SP3, and VSP, of the first substrate 310. The first to third sub-color filters CF1, CF2, and CF3, and the viewing angle restricting sub-filter VSF are formed in the plurality of openings. A common electrode 322 is formed on the first to third sub-color filters CF1, CF2, and CF3 and the viewing angle restricting sub-filter VSF. An electric field is induced between the pixel electrode 312 and common electrode 322.

In FIG. 3B, first and second electric field distorting patterns 315 and 325 are formed on the pixel and common electrodes 312 and 322 in the first to third sub-pixels SP1, SP2, and SP3, and first and third sub-color filters CF1, CF2, and CF3, respectively. When the first electric field distorting pattern 315 is formed on the pixel electrode 312 of the first substrate 310, the second electric field distorting pattern 325 is formed on the common electrode 322 of the second substrate 320. In contrast, when the first electric field distorting pattern 315 is formed on the common electrode 322 of the second substrate 320, the second electric field distorting pattern 325 is formed on the pixel electrode 312 of the first substrate 310. The first and second electric field distorting patterns 315 and 325 distort an electric field between the pixel electrode 312 and common electrode 322 such that an arrangement of the liquid crystal molecules is also distorted. The first and second electric field distorting patterns 315 and 325 may be made of a dielectric substance and may include a rib pattern or a slit pattern. In the example of FIGS. 3A and 3B, the first and second electric field distorting patterns 315 and 325 have a bent shape. However, they may include a linear shape having oblique angles to the gate line GL and data line DL.

In FIGS. 3A and 3B, the first and second electric field distorting patterns 315 and 325 are alternately arranged and parallel to each other. The first and second electric field distorting patterns 315 and 325 are oblique to the gate line GL and data line DL. The first and second electric field distorting patterns 315 and 325 may be oblique to the gate and data lines GL and DL as much as an angle of 45 degrees.

In FIGS. 3A and 3B, third and fourth electric field distorting patterns 335 and 345 are formed on the pixel and common electrodes 312 and 322 in the viewing angle restricting sub-pixel VSP and the viewing angle restricting sub-filter VSF, respectively. Similar to the first and second electric field distorting patterns 315 and 325, when the third electric field distorting pattern 335 is formed on the pixel electrode 312 in the viewing angle restricting sub-pixel VSP, the fourth electric field distorting pattern 345 is formed on the common electrode 325 in the viewing angle restricting sub-filter VSF. When the third electric field distorting pattern 335 is formed on the common electrode 325 in the viewing angle restricting sub-filter VSF, the fourth electric field distorting pattern 345 is formed on the pixel electrode 312 in the viewing angle restricting sub-pixel VSP. The third and fourth electric field distorting patterns 335 and 345 are alternately arranged and parallel to each other. The third and fourth electric field distorting patterns 335 and 345 are parallel to the gate line GL. Accordingly, the third and fourth electric field distorting patterns 335 and 345 are perpendicular to the data line DL.

A first polarizer (not shown) having a first optical axis and a second polarizer (not shown) having a second optical axis may be disposed on outer sides of the first and second substrates 310 and 320, respectively. The third and fourth electric field distorting patterns 335 and 345 may have a direction parallel to one of the first and second optical axes.

In FIGS. 3A and 3B, when the TFT T turns on, an electric field induced between the pixel and common electrodes 312 and 322. The arrangement of the liquid crystal molecules is changed due to the electric field. Accordingly, transmittance of light is controlled, thereby displaying images. In the first to third sub-pixels SP1, SP2, and SP3, the liquid crystal molecules are symmetrically arranged due to the first and second electric field distorting patterns 315 and 325. Thus, multi-domains are formed in the each of the sub-pixels SP1, SP2, and SP3, thereby improving the viewing angle.

In the viewing angle restricting sub-pixel VSP, when the TFT T turns on, the electric field between the pixel and common electrodes 312 and 322 is induced, thereby driving the liquid crystal layer. Therefore, the viewing angle along left and right sides is restricted due to the third and fourth electric field distorting patterns 335 and 345. In addition, when the TFT T of the viewing angle restricting sub-pixel VSP turns off, the viewing angle is not restricted. As a result, images are displayed through the first to third sub-color filters CF1, CF2, and CF3, and the viewing angle is improved.

FIGS. 4A to 4D show transmittance and the viewing angle of displayed images in an exemplary viewing angle restricting LCD device.

Figure 4A:
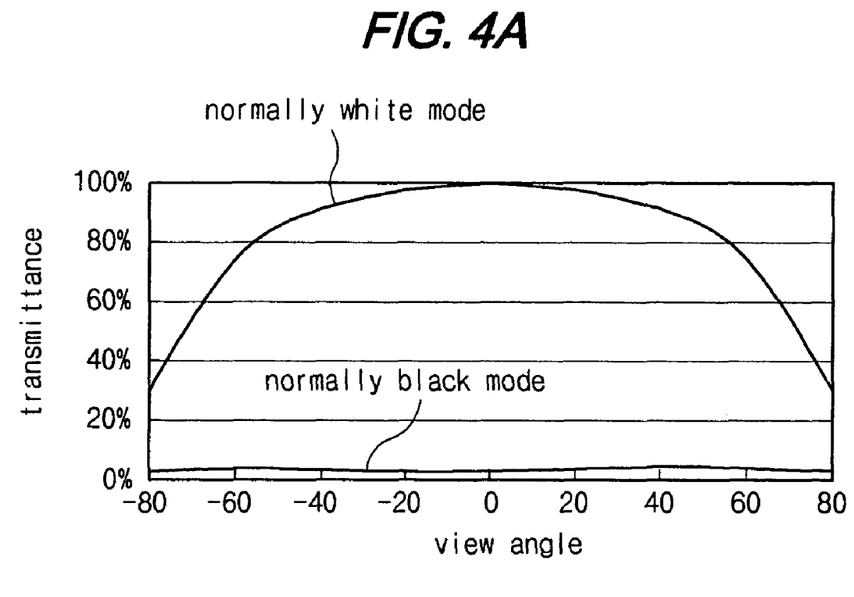
FIGS. 4A to 4D are graphs showing a transmittance on sub-pixels of an exemplary viewing angle restricting LCD device according to the present invention.

FIG. 4A shows transmittance levels in the sub-pixels. The transmittance in a normally black mode is substantially 0% in all viewing angles. In a normally white mode, transmittance in a front side is substantially 100% wherein the front side represents a 0° (zero degrees) viewing angle. Therefore, as the viewing angle increases, transmittance decreases.

Figure 4B:
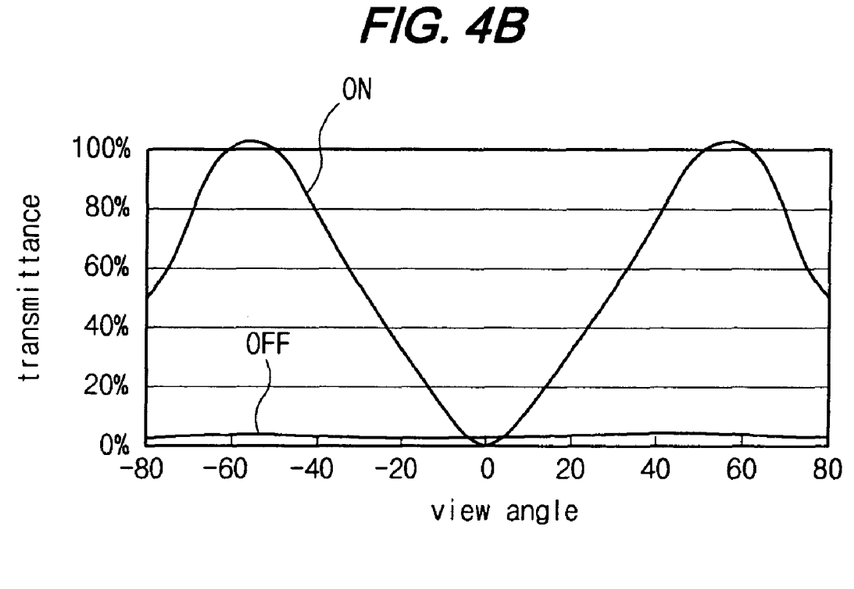

FIG. 4B shows transmittance levels in the viewing angle restricting sub-pixel. When the TFT T turns off, transmittance in the viewing angle restricting sub-pixel VSP is substantially 0%. When the TFT T turns on, transmittance in a front side is substantially 0%. Therefore, as the viewing angle increases, the transmittance increases and has a maximum value. The maximum transmittance may be at a viewing angle of 60° (degrees) from the front side.

Figure 4C:
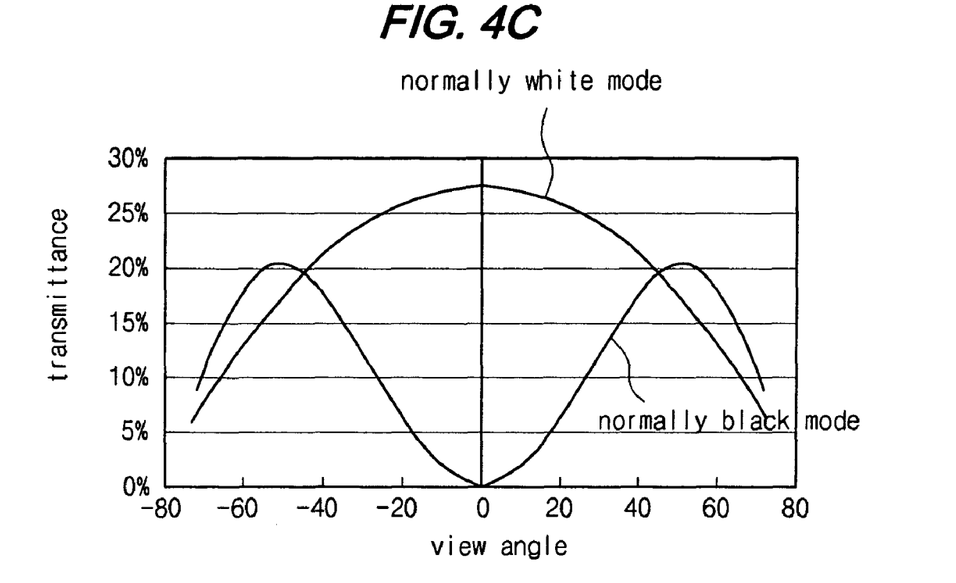

FIG. 4C shows the total transmittance in each pixel unit when the viewing angle restricting sub-pixel turns on. Accordingly, in the normally white mode, the total transmittance has a parabolic shaped curve. In addition, in the normally black mode, the total transmittance has a wave shaped curve. Furthermore, the wave shaped curve has a low peak when the viewing angle is 0° (zero degrees), and the wave shape has an upper peak when the viewing angle is 60° (degrees).

Figure 4D:
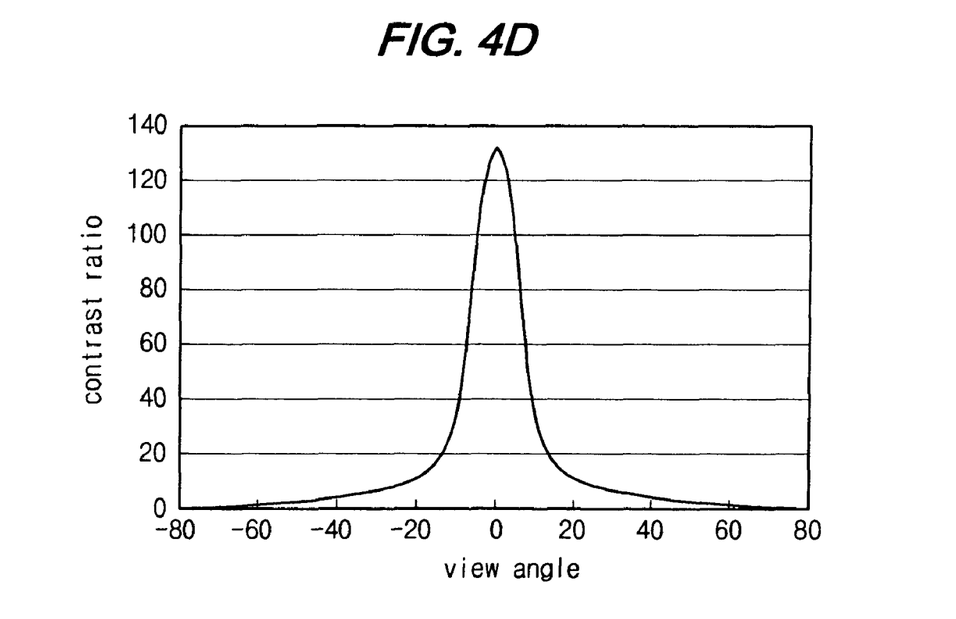

FIG. 4D shows the contrast ratio when the viewing angle is restricted. When the TFT T in the viewing angle restricting sub-pixel VSP turns on, the contrast ratio in the front side is large. However, as the viewing angle increases, the contrast ratio rapidly decreases. Therefore, observation of the displayed images is restricted from the left and right sides. Accordingly, when the TFT T in the viewing angle turns on, the displayed images are only shown from the front side. In addition, when the TFT T in the viewing angle turns off, the LCD device displays images without restricting the viewing angle because the displayed images having the improved viewing angle are displayed.

Figure 5A:
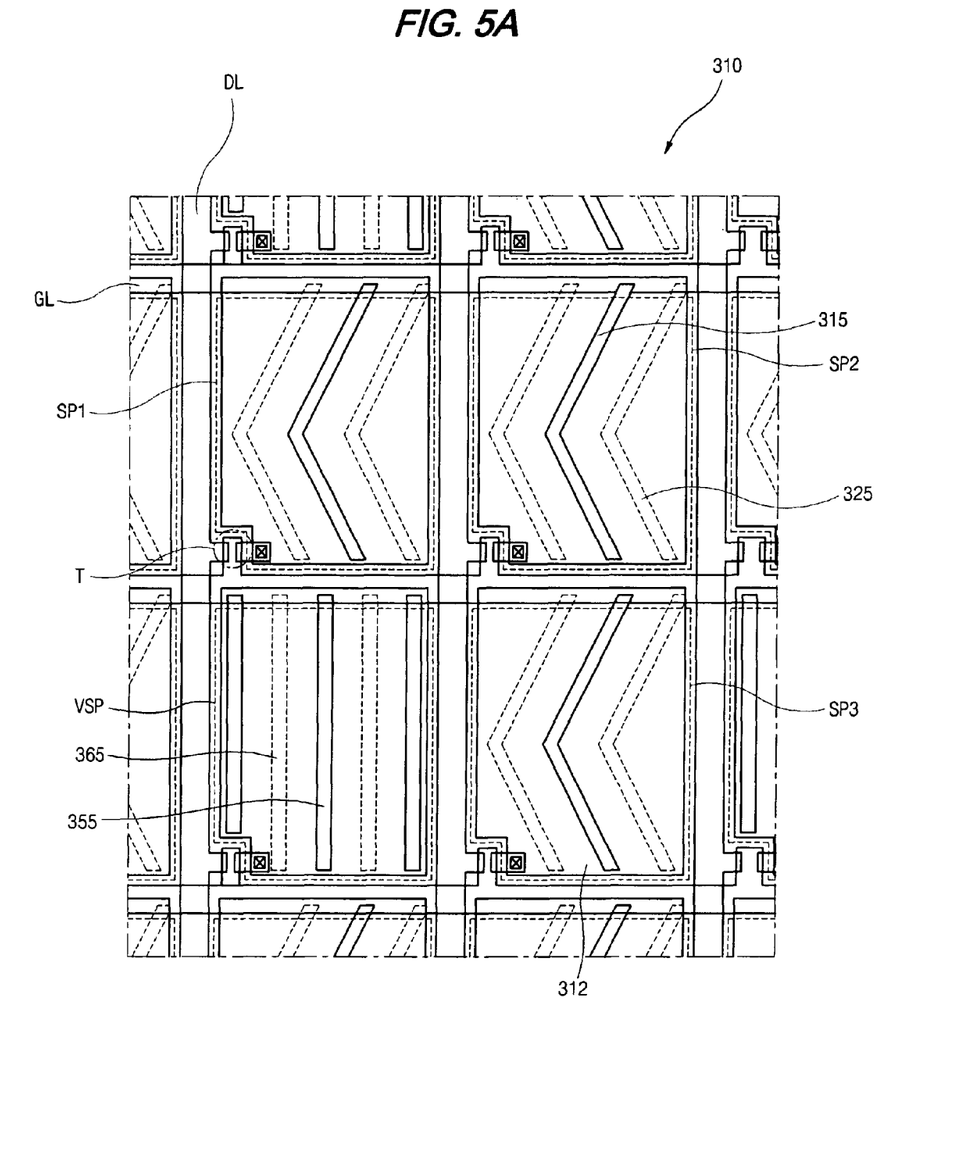
FIGS. 5A and 5B are plane views of an array substrate and a color filter substrate for an exemplary viewing angle restricting LCD device according to the present invention, respectively.
Figure 5B:
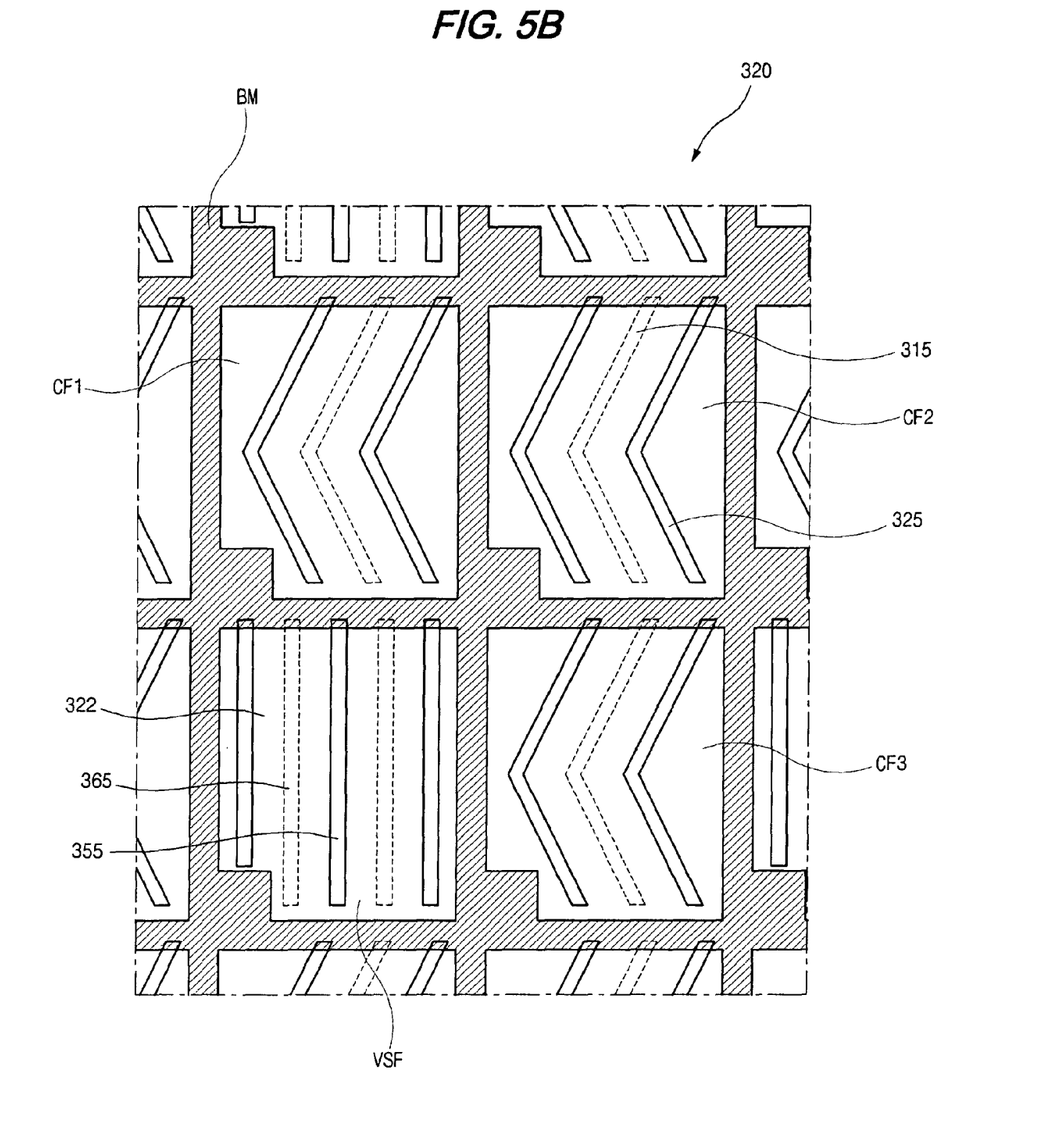

FIGS. 5A and 5B show an exemplary viewing angle restricting LCD device according to the present invention. FIG. 5A shows a pixel unit of the first substrate, and FIG. 5B shows a pixel unit of the second substrate.

In FIGS. 5A and 5B, the fifth and sixth electric field distorting patterns 355 and 365 in the viewing angle restricting sub-pixel VSP and sub-filter VSF, respectively, are parallel to the data line DL. In FIGS. 3A and 3B, the fifth and sixth electric field distorting patterns 335 and 345 are perpendicular to the gate line GL. Accordingly, since the fifth and sixth electric field distorting patterns 335 and 345 are arranged in a row, the upper and lower viewing angles are restricted.

Figure 6A:
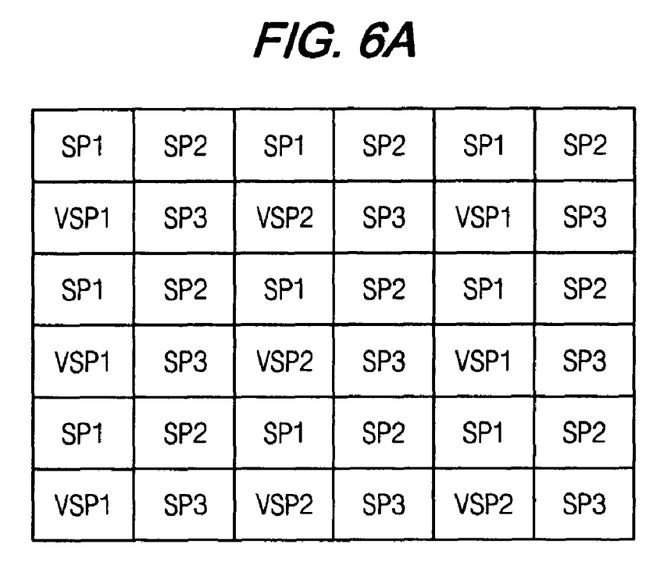
FIGS. 6A to 6F show an array substrate for an exemplary viewing angle restricting LCD device according to the present invention.
Figure 6B:
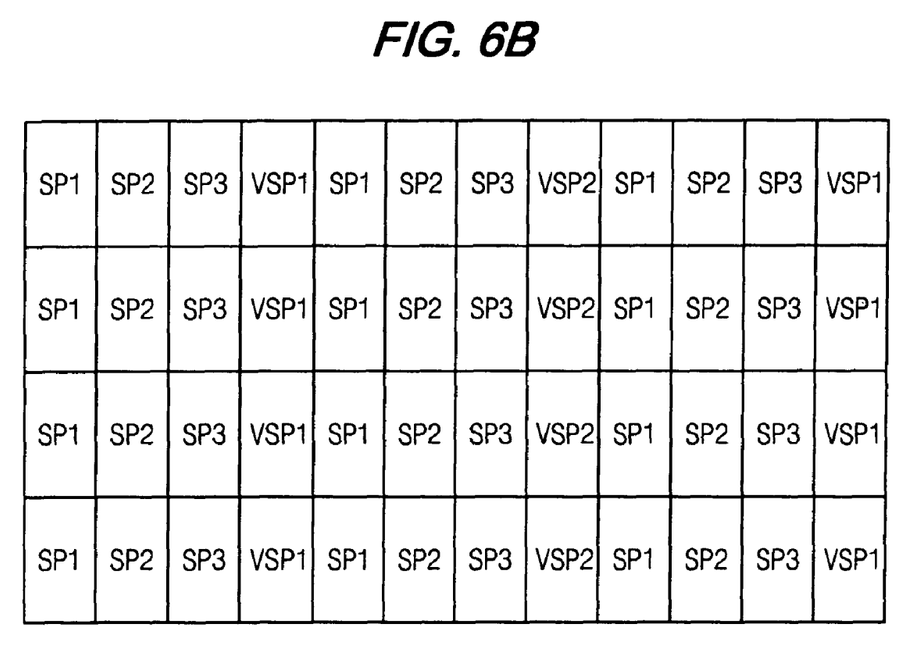
Figure 6C:
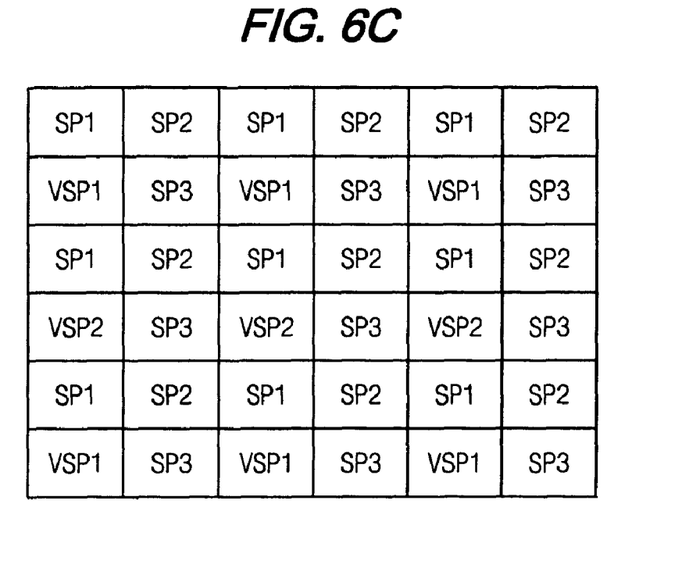
Figure 6D:
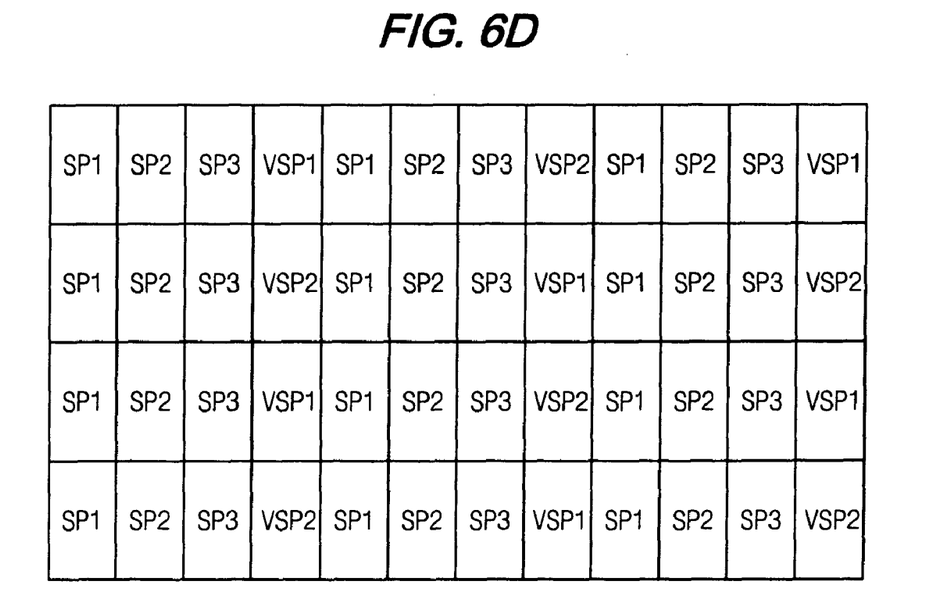
Figure 6E:
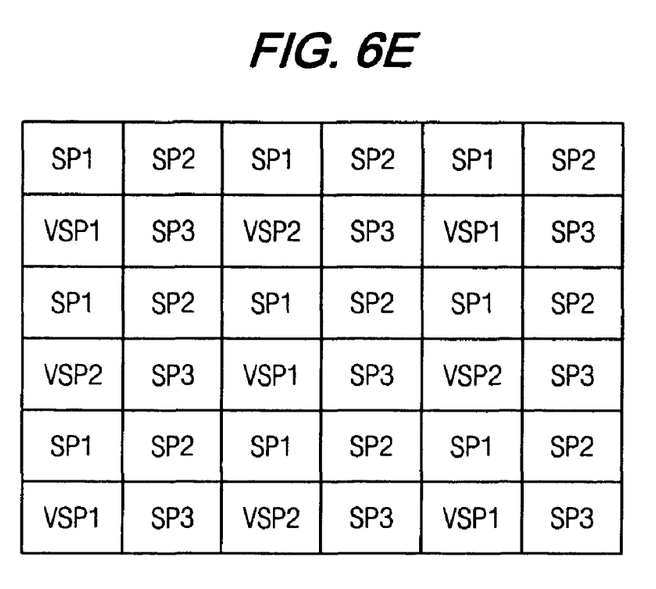
Figure 6F:
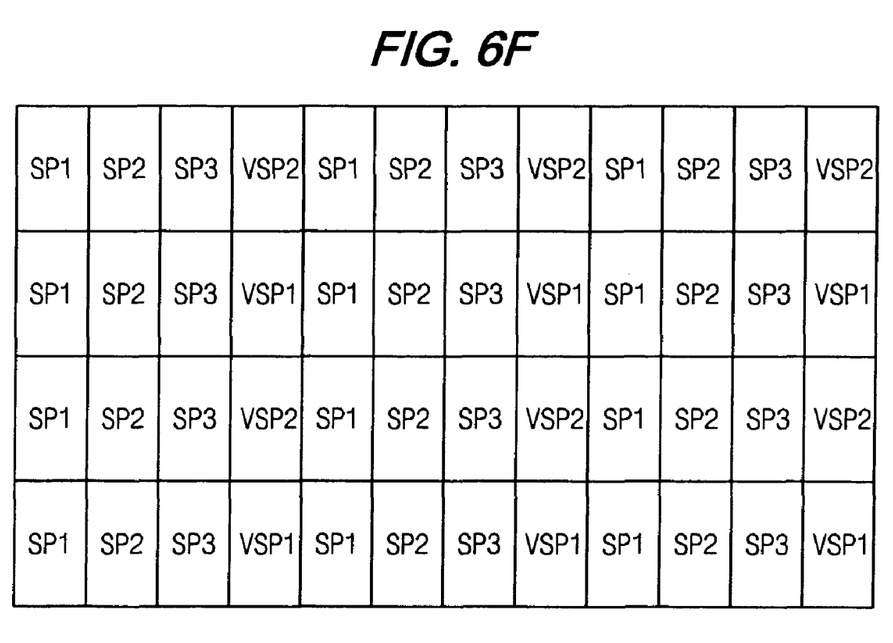

The two examples mentioned in the previous paragraph have a problem because the viewing angle is only restricted in left and right sides or upper and lower sides. According to an exemplary configuration according to the present invention as shown in FIGS. 6A and 6F, the viewing angle restricting LCD devices can simultaneously restrict the viewing angle in left and right sides and upper and lower sides. The first substrate of the viewing angle restricting LCD device includes first and second viewing angle restricting sub-pixels VSP1 and VSP2 in each unit pixel. In addition, first and second viewing angle restricting sub-filters (not shown) corresponding to the first and second viewing angle restricting sub-pixels VSP1 and VSP2, respectively, are formed on the second substrate.

The first viewing angle restricting sub-pixel VSP1 (not shown) and the first viewing angle restricting sub-filter (not shown) include the third and fourth electric field distorting patterns 335 and 345 (FIGS. 3A and 3B), respectively, wherein the left and right side viewing angles are restricted. In addition, the second viewing angle restricting fifth sub-pixel VSP2 and the sub-filter (not shown) include the fifth and sixth electric field distorting patterns 355 and 365 (FIGS. 5A and 5B), respectively, so that the viewing angle in the upper and lower sides is restricted. Furthermore, the first and second viewing angle restricting sub-pixels VSP1 and VSP2 may be alternately arranged in each pixel unit. A pixel unit (not shown) includes the first to third sub-pixels SP1, SP2, and SP3, and first viewing angle restricting sub-pixel VSP1. A second pixel unit (not shown) includes the first to third sub-pixels SP1, SP2, and SP3 and second viewing angle restricting sub-pixel VSP2. In addition, the first and second pixel units are alternately arranged and have either a matrix shape of two by two or a stripe shape.

The LCD device having the structure of the previous paragraph displays images by simultaneously restricting the viewing angle in left and right sides as well as upper and lower sides. Accordingly, four sub-pixels including the first to third sub-pixels SP1, SP2, and SP3, and one of the first and second viewing angle restricting sub-pixels VSP1 and VSP2 are arranged in either a matrix shape of two by two or in a row.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate;
   a second substrate facing the first substrate;
   a liquid crystal layer interposed between the first and second substrates;
   first, second, third, and fourth sub-pixels defined on the first and second substrates;
   a first electric field distorting pattern on the first, second and third sub-pixels on the first substrate;
   a second electric field distorting pattern on the first, second and third sub-pixels on the second substrate;
   a third electric field distorting pattern on the fourth sub-pixel on the first substrate; and
   a fourth electric field distorting pattern on the fourth sub-pixel on the second substrate,
   wherein the first and second electric field distorting patterns are parallel to each other, and
   wherein the third and fourth electric field distorting patterns are parallel to each other at an angle that is different than that of the first and second distorting patterns,
   wherein the first, second, third and fourth sub-pixels are arranged in a two by two matrix shape or continuously arranged in the first direction.

2. The device according to claim 1, wherein the first and second electric field distorting patterns are alternately arranged and the third and fourth electric field distorting patterns are alternately arranged.

3. The device according to claim 1, wherein the first, second, third and fourth electric field distorting patterns include a dielectric material having one of a rib pattern and a slit pattern.

4. The device according to claim 1, wherein each of the first, second and third sub-pixels includes one of red, green, and blue colors.

5. The device according to claim 1, wherein the sub-pixels are defined by:
   a plurality of gate lines along a first direction on the first substrate;
   a plurality of data lines crossing the plurality of gate lines to define the first, second, third and fourth sub-pixels; and
   a plurality of thin film transistors connected to the plurality of gate lines and the plurality of data lines.

6. The device according to claim 5, wherein the first and second distorting patterns have a zigzag shape that is oblique to the gate lines.

7. The device according to claim 5, wherein the third and fourth distorting patterns are one of parallel and perpendicular with respect to the gate lines.

8. The device according to claim 1, wherein the sub-pixels are further defined by:
   a plurality of pixel electrode formed in each of the first, second, third, and fourth sub-pixels on an inner surface of the first substrate, the plurality of pixel electrodes connected to the plurality of thin film transistors; and
   a common electrode on an inner surface of the second substrate.

9. The device according to claim 1, further comprising:
   a fifth sub-pixel defined on the first and second substrates;
   a fifth electric field distorting pattern on the fifth sub-pixel on the first substrate; and
   a sixth electric field distorting pattern on the fifth sub-pixel on the second substrate,
   wherein the fifth and sixth electric field distorting patterns are parallel to each other and perpendicular to the data lines.

10. The device according to claim 9, further comprising alternately arranged first and second unit pixels, wherein the first unit pixel includes the first, second, third and fourth sub-pixels, and the second unit pixels includes the first, second, third and fifth sub-pixels.

11. The device according to claim 1, further comprising a first polarizer having a first optical axis on an outer surface of the first substrate and a second polarizer having a second optical axis on an outer surface of the second substrate.

12. The device according to claim 11, wherein the first optical axis is perpendicular to the second optical axis.

13. The device according to claim 11, wherein the third and fourth electric filed distorting patterns are parallel to one of the first and second optical axes.

14. A liquid crystal display device, comprising:
   a first substrate;
   a second substrate facing the first substrate;
   a liquid crystal layer interposed between the first and second substrates; and
   first, second, third, and fourth sub-pixels defined on the first and second substrates, the first, second, and third sub-pixels having electric field distorting patterns to increase viewing angle, and the fourth sub-pixel having electric field distorting patterns to restrict viewing angle,
   wherein the first, second, third and fourth sub-pixels are arranged in a two by two matrix shape or continuously arranged in the first direction.

15. The liquid crystal display device according to claim 14, further comprising: a fifth sub-pixel defined on the first and second substrates;
   alternately arranged first and second unit pixels,
   wherein the first unit pixel includes the first, second, third and fourth sub-pixels, and the second unit pixels includes the first, second, third and fifth sub-pixels.

16. The liquid crystal display device according to claim 15, wherein the first, second, third, and fourth sub-pixels are arranged in one of a matrix shape and a stripe shape.

17. The liquid crystal display device according to claim 15, wherein the first, second, third, and fifth sub-pixels are arranged in one of a matrix shape and a stripe shape.

18. A liquid crystal display device, comprising:
a first substrate;
a second substrate facing the first substrate;
a liquid crystal layer interposed between the first and second substrates; and
a pixel array defined on the first and second substrates, each pixel of the pixel array including at least first, second, third and fourth sub-pixels such that the fourth sub-pixel has a restricted viewing angle as compared to the first, second, and third sub-pixels,
wherein the first, second, third and fourth sub-pixels are arranged in a two by two matrix shape or continuously arranged in the first direction.

* * * * *